(12) United States Patent
Aoyagi et al.

(10) Patent No.: US 6,961,705 B2
(45) Date of Patent: Nov. 1, 2005

(54) INFORMATION PROCESSING APPARATUS, INFORMATION PROCESSING METHOD, AND STORAGE MEDIUM

(75) Inventors: Seiichi Aoyagi, Chiba (JP); Yasuharu Asano, Kanagawa (JP); Miyuki Tanaka, Tokyo (JP); Jun Yokono, Kanagawa (JP); Toshio Oe, Kanagawa (JP)

(73) Assignee: Sony Corporation, Tokyo (JP)

( * ) Notice: Subject to any disclaimer, the term of this patent is extended or adjusted under 35 U.S.C. 154(b) by 355 days.

(21) Appl. No.: 09/765,962

(22) Filed: Jan. 19, 2001

(65) Prior Publication Data

US 2001/0041977 A1 Nov. 15, 2001

(30) Foreign Application Priority Data

Jan. 25, 2000  (JP) ...................................... P2000-015265

(51) Int. Cl.$^7$ .............................................. G10L 21/00
(52) U.S. Cl. ........................................ 704/275; 704/270
(58) Field of Search ............................ 704/9, 251, 257, 704/270, 275, 260, 235, 272, 200; 706/52, 58; 725/116, 14, 34; 705/27, 10, 14, 74, 26; 463/40; 434/321; 379/88.24; 455/3.04

(56) References Cited

U.S. PATENT DOCUMENTS

| | | | | | |
|---|---|---|---|---|---|
| 5,193,058 A | * | 3/1993 | Bassili et al. | ................ | 434/321 |
| 5,384,894 A | * | 1/1995 | Vassiliadis et al. | ............ | 706/52 |
| 5,530,950 A | * | 6/1996 | Medan et al. | ............. | 379/88.24 |
| 5,544,040 A | * | 8/1996 | Gerbaulet | ..................... | 705/26 |
| 5,576,951 A | * | 11/1996 | Lockwood | ..................... | 705/27 |
| 5,685,000 A | * | 11/1997 | Cox, Jr. | .......................... | 704/9 |
| 5,754,938 A | * | 5/1998 | Herz et al. | ..................... | 705/74 |
| 5,754,939 A | * | 5/1998 | Herz et al. | ..................... | 725/34 |
| 5,758,257 A | * | 5/1998 | Herz et al. | ..................... | 705/51 |
| 5,765,142 A | * | 6/1998 | Allred et al. | .................. | 705/26 |
| 5,774,860 A | * | 6/1998 | Bayya et al. | ................. | 704/275 |
| 5,809,471 A | * | 9/1998 | Brodsky | ................... | 704/275 |
| 5,835,087 A | * | 11/1998 | Herz et al. | ..................... | 725/14 |
| 5,916,024 A | * | 6/1999 | Von Kohorn | ................ | 463/40 |
| 5,930,757 A | * | 7/1999 | Freeman | ..................... | 704/272 |
| 6,029,195 A | * | 2/2000 | Herz | .......................... | 725/116 |
| 6,076,068 A | * | 6/2000 | DeLapa et al. | ................ | 705/14 |
| 6,477,509 B1 | * | 11/2002 | Hammons et al. | ............ | 705/27 |
| 2001/0032115 A1 | * | 10/2001 | Goldstein | ..................... | 705/10 |

FOREIGN PATENT DOCUMENTS

JP  2001-016335 A  *  1/2001  ............ H04M/3/42

OTHER PUBLICATIONS

Eliza—A Computer Program For the Study of Natural Language Communication Between Man and Machine, Joseph Weizenbaum's ELIZA: Communication of the ACM, Jan. 1996, http://i5.nyu.edu/~mm64/x52.9265/january 1996.html.

Allen 1995: Natural Language Understanding—Introduction www.uni-giessen.de/~g91062/Seminare/gk-cl/Allen95/a1119501.htm.

* cited by examiner

Primary Examiner—Angela Armstrong
(74) Attorney, Agent, or Firm—Bell, Boyd & Lloyd LLC

(57) ABSTRACT

Speech of a user is recognized in a speech recognizing unit. Based on a result of the speech recognition, a language processing unit, a dialog managing unit and a response generating unit cooperatively created a dialog sentence for exchanging a dialog with the user. Also, based on the speech recognition result, the dialog managing unit collects user information regarding, e.g., interests and tastes of the user. Therefore, the user information regarding, the interests and tastes of the user can be easily collected.

6 Claims, 13 Drawing Sheets

FIG. 7A

| IDENTIFIER | INTEREST INFORMATION | THRESHOLD |
|---|---|---|
| C1 | MOVIE | 4 |
| C2 | MUSIC | 3 |
| C3 | CAR | 7 |
| C4 | BOOK | 5 |
| C5 | TRAVEL | 5 |

FIG. 7B

| IDENTIFIER | INTEREST INFORMATION | NUMBER OF TIMES | INTEREST FLAG |
|---|---|---|---|
| C1 | MOVIE | 3 | 0 |
| C2 | MUSIC | 4 | 0 |
| C3 | CAR | 5 | 1 |
| C4 | BOOK | 2 | 0 |
| C5 | TRAVEL | 3 | 1 |

US 6,961,705 B2

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium. More particularly, the present invention relates to an information processing apparatus and method which can easily collect user information indicating, e.g., interests and tastes of users, as well as a storage medium storing a program required for executing the information processing.

2. Description of the Related Art

DESCRIPTION OF THE RELATED ART

For example, WWW (World Wide Web) servers constructed on the Internet, which has recently become more prevalent with rapidly expanding popularity, provide a great deal amount of information. It is difficult for users to search for desired information from among such a great deal amount of information by themselves. Web pages called search engines are therefore presented.

Web pages serving as search engines are provided by, e.g., INFOSEEK® and YAHOO®.

When searching information provided by WWW servers, users perform such predetermined operations as accessing web pages serving as search engines, and entering keywords regarding information to be searched for. As a result, the users can obtain search results from the search engines.

However, even when utilizing a search engine to search for information, various categories of information containing an entered keyword are provided as search results. Users are therefore required to seek desired items from among those various categories of information by themselves, which is troublesome.

One conceivable solution is to prepare a profile representing user information regarding, e.g., interests and tastes of a user, in advance, and to present those items of information among search results of a search engine, which match the profile of the user.

In such a conventional method, however, a user is required to manipulate a keyboard, a mouse or the like to enter answers for various questions in order to acquire user information necessary for preparing a user profile. The conventional method therefore imposes a large burden on the user.

SUMMARY OF THE INVENTION

In view of the state of the art set forth above, it is an object of the present invention to easily collect user information regarding interests and tastes of users.

To achieve the above object, an information processing apparatus according to the present invention comprises a speech recognizing unit for recognizing the speech of a user; a dialog sentence creating unit for creating a dialog sentence to exchange a dialog with the user based on a result of the speech recognition performed by the speech recognizing unit; and a collecting unit for collecting the user information based on the speech recognition result.

The information processing apparatus may further comprise a storage unit for storing the user information.

The dialog sentence creating unit may output the dialog sentence in the form of a text or synthesized sounds.

The collecting unit may collect the user information based on an appearance frequency of a word contained in the speech recognition result.

Also, the collecting unit may collect the user information based on a broader term of a word contained in the speech recognition result.

Further, the collecting unit may count the number of times the same topic is mentioned or included in the speech based on the speech recognition result, and may collect the user information based on the counted number.

Still further, the collecting unit may track a on time interval when the same topic is mentioned or included in the speech based on the speech recognition result, and may collect the user information based on the time interval.

Still further, the collecting unit may count the number of times the same topic is mentioned or included in the speech based on the speech recognition result, and may collect the user information based on the counted number.

The user information may be information indicating interests or tastes of the user.

An information processing method according to the present invention comprises a speech recognizing step of recognizing the speech of a user; a dialog sentence creating step of creating a dialog sentence to exchange a dialog with the user based on a result of the speech recognition performed by the speech recognizing step; and a collecting step of collecting the user information based on the speech recognition result.

A storage medium according to the present invention stores a program comprising a speech recognizing step of recognizing the speech of a user; a dialog sentence creating step of creating a dialog sentence to exchange a dialog with the user based on a result of the speech recognition performed by the voice recognizing step; and a collecting step of collecting the user information based on the speech recognition result.

With the information processing apparatus, the information processing method, and the storage medium according to the present invention, the speech of a user is recognized and a dialog sentence for exchanging a dialog with the user is created based on a result of the speech recognition. Also, user information is collected based on the speech recognition result.

BRIEF DESCRIPTION OF THE DRAWINGS

FIGS. 7A and 7B are tables showing examples of profile management information and a user profile, respectively.

DESCRIPTION OF THE PREFERRED EMBODIMENTS

Preferred embodiments of the present invention will be described below with reference to the drawings.

Figure 1:
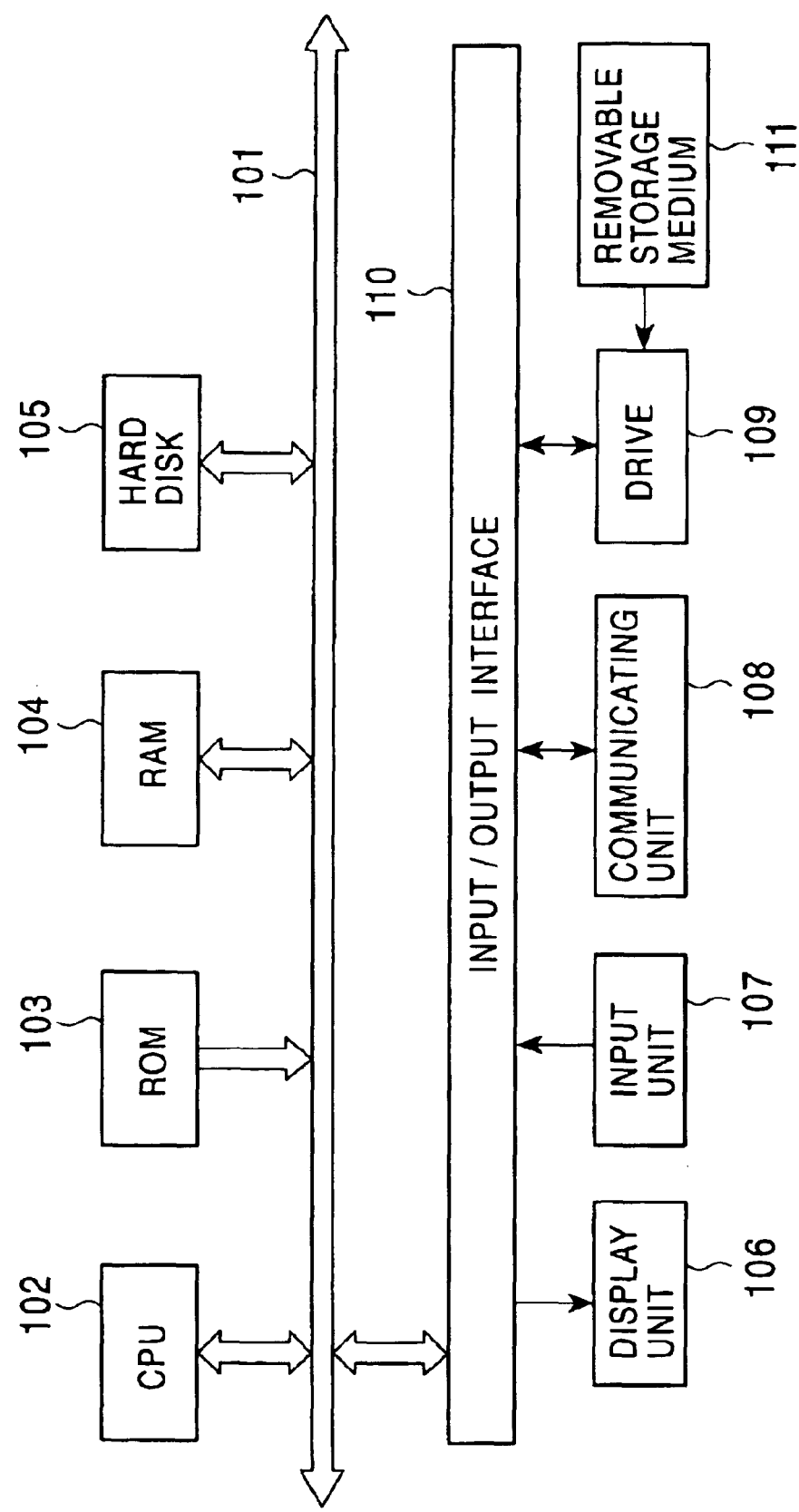
FIG. 1 is a block diagram showing an example of the configuration of a computer as one embodiment of the present invention.

FIG. 1 shows an example of the configuration of a computer as one embodiment of the present invention.

The computer shown in FIG. 1 installs therein a program for executing a sequence of processing steps described later.

The program can be stored in a hard disk 105 or a ROM (Read Only Memory) 103 beforehand, which are incorporated as storage mediums in the computer.

As an alternative, the program may be temporarily or permanently stored (recorded) in a removable storage medium 111 such as a floppy disk, CD-ROM (Compact Disc Read Only Memory), MO (Magneto-optical) disk, DVD (Digital Versatile Disc), magnetic disk, and a semiconductor memory. Such a removable storage medium 111 can be provided in the form of so-called package software.

A manner of installing the program in the computer is not limited to the above-described one using the removable storage medium 111. The program may be transferred from a download site to the computer over the air via an artificial satellite for digital satellite broadcasting, or may be transferred to the computer through wire via a network such as the Internet. In any case, the computer receives the transferred program by a communicating unit 108 and installs the program in the internal hard disk 105.

The computer incorporates a CPU (Central Processing Unit) 102 therein. An input/output interface 110 is connected to the CPU 102 via a bus 101. When a command is inputted through the input/output interface 110 upon the user manipulating an input unit 107 constituted by a keyboard, a mouse or the like, the CPU 102 runs the program stored in the ROM 103 in accordance with the command. Also, the CPU 102 loads, into a RAM (Random Access Memory) 104, the program stored in the hard disk 105, or the program transferred via a satellite or a network and installed in the hard disk 105 after being received by the communicating unit 108, or the program installed in the hard disk 105 after being read out of the removable storage medium 111 inserted in a drive 109, and then runs the loaded program. By so running the program, the CPU 102 executes processing in accordance with flowcharts described later, or processing in accordance with block diagrams described later. After that, the CPU 102 outputs a result of the processing from an output unit 106 constituted by an LCD (Liquid Crystal Display), a speaker or the like through the input/output interface 110, or transmits it from the communicating unit 108 through the input/output interface 110, or stores it in the hard disk 105, as required.

In this embodiment, a program for operating the computer to function as an interactive user-profile collecting system, described later, is installed. When the CPU 102 runs that installed program, the computer functions as an interactive user-profile collecting system shown in FIG. 2.

Figure 2:
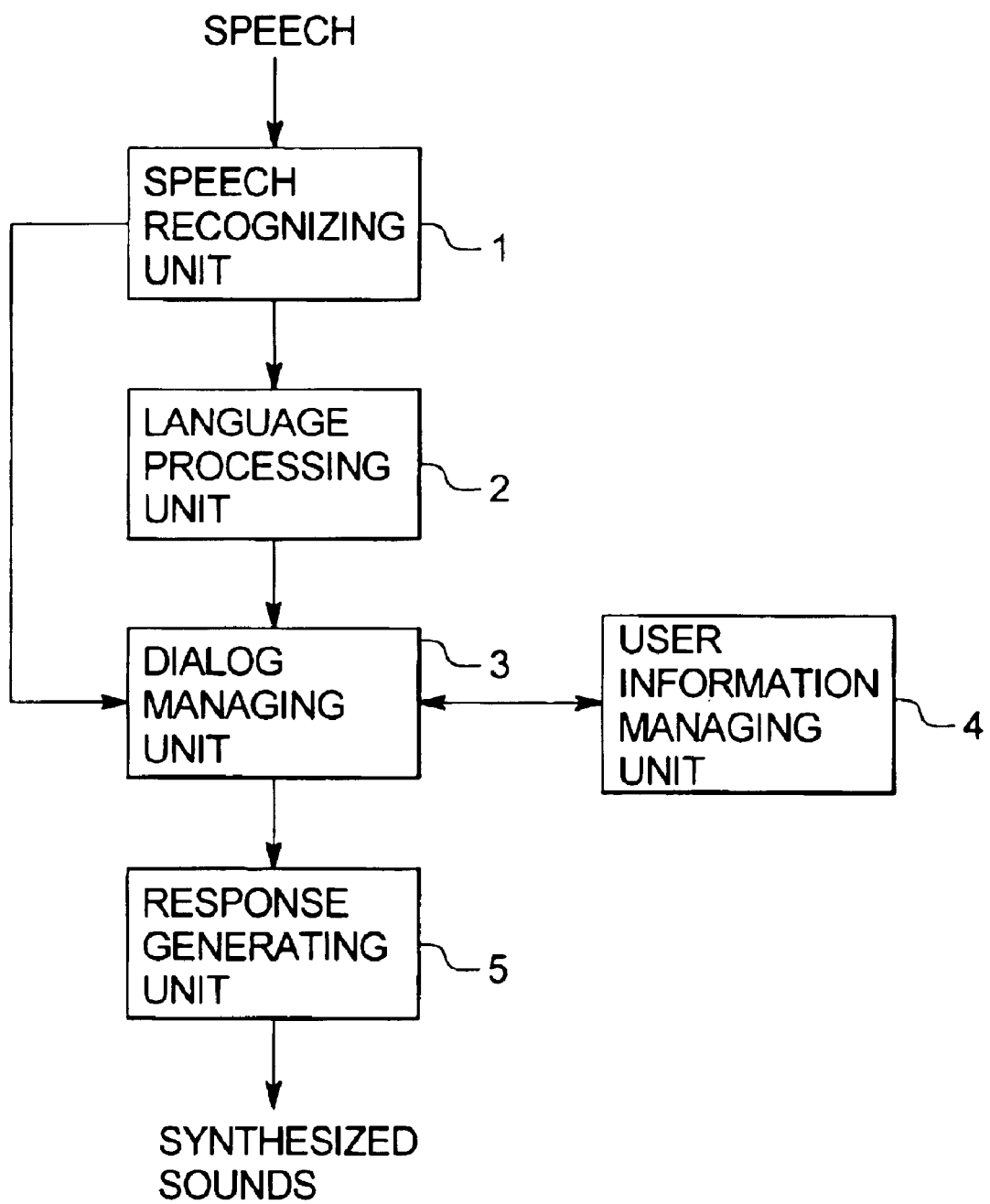
FIG. 2 is a block diagram of one embodiment of an interactive user-profile collecting system whose function is realized by the computer shown in FIG. 1.

FIG. 2 shows an example of the configuration of one embodiment of the interactive user-profile collecting system whose function is realized by the computer shown in FIG. 1 with the CPU 102 running the relevant program.

When a voice dialog is performed between the computer and a user, the interactive user-profile collecting system collects user information regarding, e.g., interests and tastes of the user, based on speech, etc. spoken by the user in the dialog, and stores (records) the collected user information as a user profile.

More specifically, speech or words spoken by the user are inputted by a speech recognizing unit 1. The speech unit 1 recognizes the input speech and outputs a text (phoneme information), which is obtained as a result of the speech recognition, to a language processing unit 2. Also, the speech recognizing unit 1 extracts rhythm information of the speech spoken by the user, and outputs the extracted rhythm information to a dialog managing unit 3.

The language processing unit 2 carries out language processing of the speech recognition result outputted from the speech recognizing unit 1, and outputs information regarding words, syntax and meaning contained in the speech recognition result, as a result of the language processing, to the dialog managing unit 3.

The dialog managing unit 3 performs dialog management for generating a sentence for use in exchanging a dialog with the user (i.e., a dialog sentence), and extracts the user information. More specifically, the dialog managing unit 3 produces response generation information, which instructs generation of a response sentence, etc. in reply to the user speech recognized by the speech recognizing unit 1, based on, for example, the language processing result outputted from the language processing unit 2, and outputs the response generation information to a response generating unit 5. Also, the dialog managing unit 3 collects the user information indicating interests and tastes of the user based on, for example, the language processing result outputted from the language processing unit 2 and the phoneme information outputted from the speech recognizing unit 1, and supplies the collected user information to a user information management unit 4.

The user information management unit 4 stores, as a user profile, the user information supplied from the dialog managing unit 3.

In accordance with the response generation information supplied from the dialog managing unit 3, the response generating unit 5 generates a response sentence, etc. in reply to the user voices and outputs it in the form of synthesized sounds.

Thus, in the interactive user-profile collecting system having the above-described configuration, speech spoken by a user are recognized by the speech recognizing unit 1, and a result of the speech recognition is supplied to the language processing unit 2. The language processing unit 2 interprets the meaning (contents) of the speech recognition result from the speech recognizing unit 1, and supplies a result of the language processing to the dialog managing unit 3. Based on an output of the language processing unit 2, the dialog managing unit 3 produces response generation information for generating a response sentence, etc. in reply to the user is speech and, and then supplies the response generation information to the response generating unit 5. In accordance with the response generation information from the dialog managing unit 3, the response generating unit 5 generates the response sentence, etc. and outputs it in the form of synthesized sounds.

When the user speaks in reply to the response sentence, etc. outputted from the response generating unit 5, a speech uttered by the user is subjected to speech recognition by the speech recognizing unit 1. Subsequently, the above-described processing is repeated, whereby the dialog between the user and the computer progresses.

In parallel to the dialog progressing performed in such a way, the dialog managing unit 3 collects user information indicating interests and tastes of the user based on the outputs of both the speech recognizing unit 1 and the language processing unit 2, and supplies the collected user information to the user information management unit 4. The user information management unit 4 then stores, as a user profile, the user information supplied from the dialog managing unit 3.

Accordingly, in the interactive user-profile collecting system of FIG. 2, a dialog is performed between the user and the computer, and the user information is collected during the dialog without consciousness of the user. As a result, the user information can be easily collected and stored (without causing the user to feel any burden).

Figure 3:
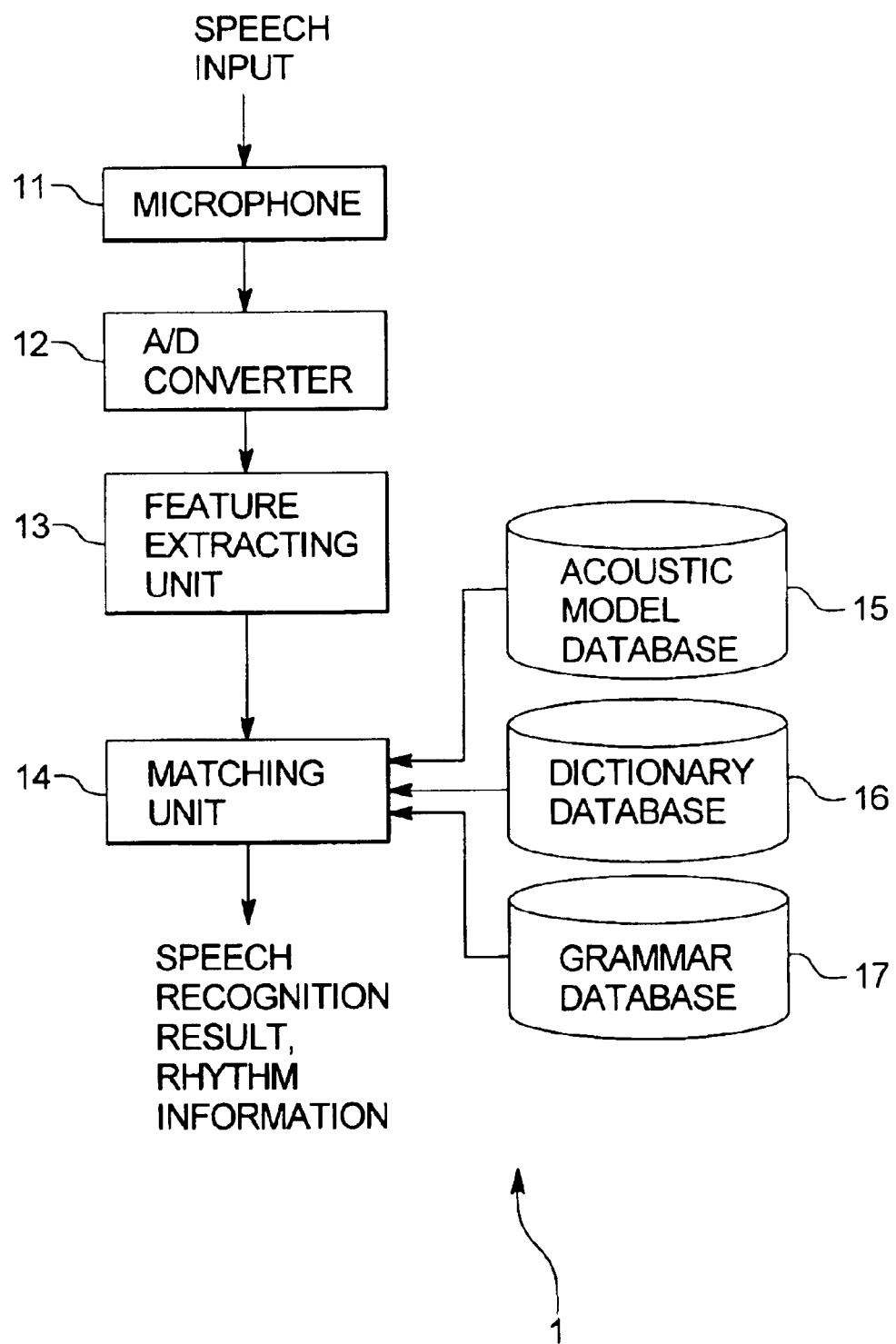
FIG. 3 is a block diagram showing an example of the configuration of a voice recognizing unit.

FIG. 3 shows an example of the functional configuration of the voice recognizing unit 1 in FIG. 2.

A speech by the user is inputted to a microphone 11 that converts the speech into an electrical signal. The voice signal is supplied to an A/D (Analog-to-Digital) converter 12. The A/D converter 12 carries out sampling and quantization of the signal in the form of an analog signal supplied from the microphone 11 for conversion into speech data in the form of a digital signal. The speech data is supplied to a feature extracting unit 13.

For each appropriate frame of the speech data supplied from the A/D converter 12, the feature extracting unit 13 extracts feature parameters such as a spectrum, a linear prediction coefficient, a cepstrum coefficient, a linear spectrum pair and an MFCC (Mel Frequency Cepstrum Coefficient), and then supplies the extracted feature parameters to a matching unit 14.

Based on the feature parameters supplied from the feature extracting unit 13, the matching unit 14 recognizes speech inputted to the microphone 11 (i.e., inputspeech) while referring to an acoustic model database 15, a dictionary database 16 and a grammar database 17 as required.

More specifically, the acoustic model database 15 stores acoustic models representing acoustic features such as individual phonemes and syllables in the language relating to the speech recognized speech. For example, an HMM (Hidden Markov Model) can be used herein-as the acoustic model. The dictionary database 16 stores a word dictionary describing information about pronunciations of individual words to be recognized. The grammar database 17 stores grammar rules defining how the individual words registered in the word dictionary of the dictionary database 16 are linked with each other. For example, rules based on Context Free Grammar (CFG), HPSG (Head-driven Phrase Structure Grammar), statistical word linkage probability (N-gram), etc. can be herein used as the grammar rules.

The matching unit 14 constructs an acoustic model of each word (i.e., a word model) by connecting relevant ones of the acoustic models stored in the acoustic model database 15 with each other while referring to the word dictionary stored in the dictionary database 16. Further, the matching unit 14 connects several word models with each other while referring to the grammar rules stored in the grammar database 17, and recognizes the speech inputted to the microphone 11 with the HMM method, for example, based on the feature parameters by using the word models thus connected.

Phoneme information obtained as a result of the speech recognition executed by the matching unit 14 is outputted to the language processing unit 2 in the form of, e.g., a text.

Also, the matching unit 14 extracts rhythm information of the speech inputted to the microphone 11 and outputs the extracted rhythm information to the dialog managing unit 3. More specifically, by way of example, the matching unit 14 counts the mora number in the result of the speech recognition obtained as described above, calculates the mora number per frame, etc., and outputs a calculation result as a user speaking speed to the dialog managing unit 3.

Figure 4:
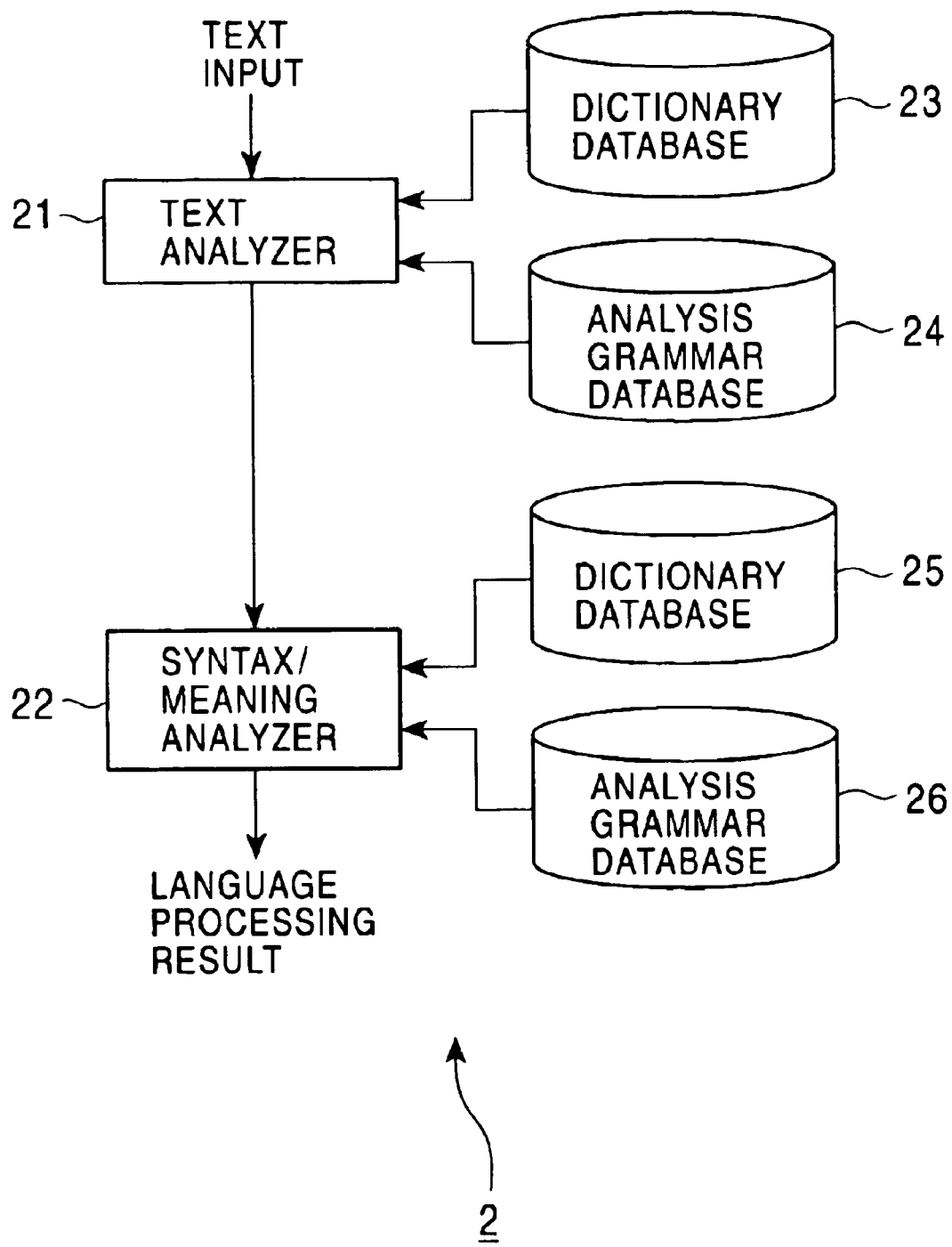
FIG. 4 is a block diagram showing an example of the configuration of a language processing unit.

FIG. 4 shows an example of the functional configuration of the language processing unit 2 in FIG. 2.

The text (rhythm information) outputted as the speech recognition result from the speech recognizing unit 1 (the matching unit 14 in FIG. 3) is inputted to a text analyzer 21. The text analyzer 21 analyzes the input text while referring to a dictionary database 23 and an analysis grammar database 24.

More specifically, the dictionary database 23 stores a word dictionary describing a notation of each word, part-of-speech information required to apply the grammar for analyzing the text, etc. The analysis grammar database 24 stores analysis grammar rules defining restrictions, etc. with respect to word linkage based on the information of each word described in the word dictionary of the dictionary database 23. Then, based on the word dictionary and the analysis grammar rules, the text analyzer 21 analyzes morphemes of the text (voice recognition result) inputted to it, and outputs an analysis result to a syntax/meaning analyzer 22.

Based on the output of the text analyzer 21, the syntax/meaning analyzer 22 performs syntax analysis of the speech recognition result from the speech recognizing unit 1 and interpretation of the meaning thereof while referring to a dictionary database 25 and an analysis grammar database 26. Further, the syntax/meaning analyzer 22 adds, to the speech recognition result from the voice recognizing unit 1, information representing the concept and meaning of each of the words contained in the speech recognition result, and then outputs an addition result, as a language processing result, to the dialog managing unit 3.

The dictionary database 25 and the analysis grammar database 26 store similar contents of information as those stored in the dictionary database 23 and the analysis grammar database 24, respectively. Furthermore, the syntax/meaning analyzer 22 performs syntax analysis and interpretation of the meaning by using the normal grammar, Context Free Grammar (CFG), HPSG, and statistical word linkage probability (N-gram), etc.

Figure 5:
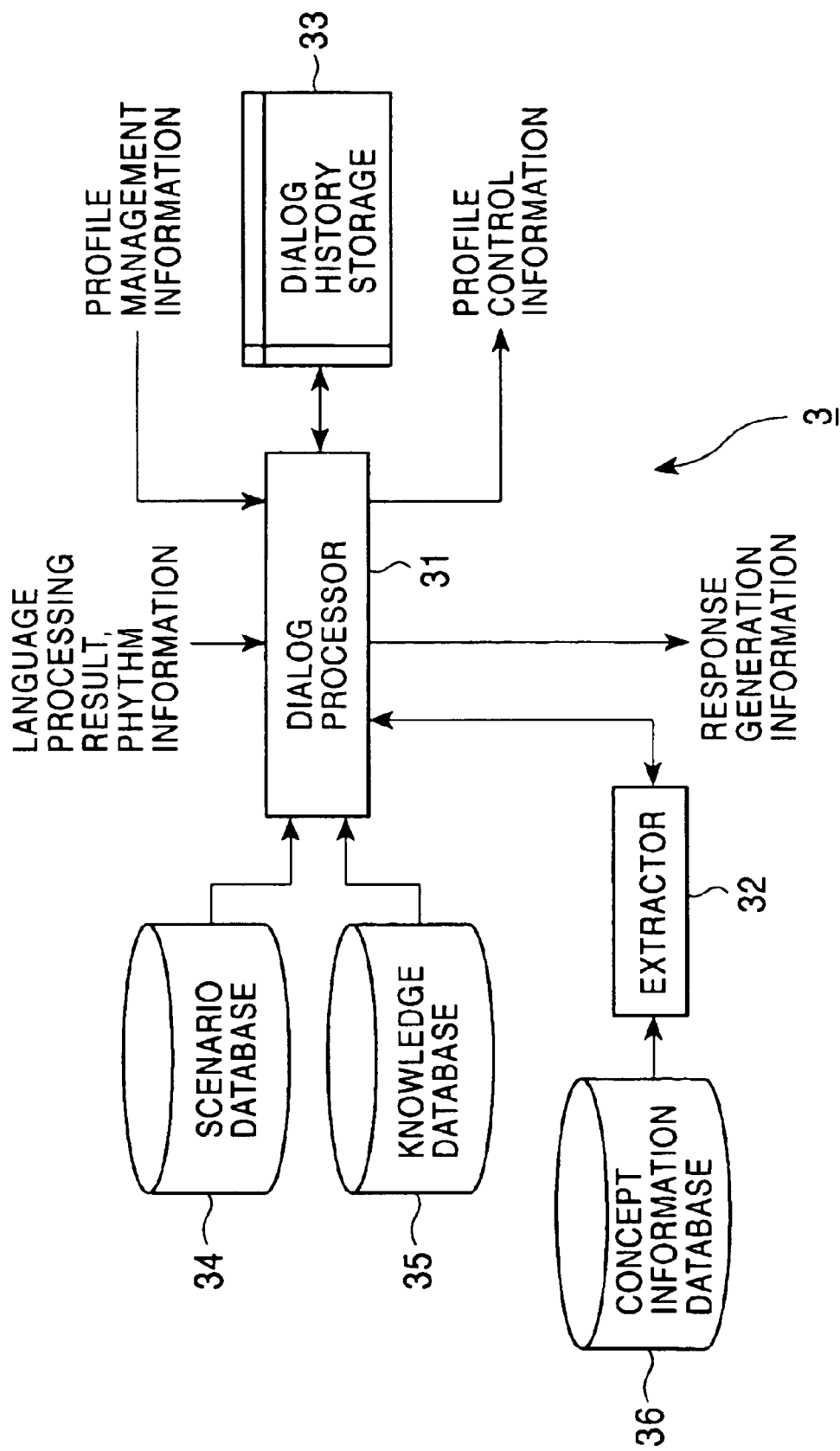
FIG. 5 is a block diagram showing an example of the configuration of a dialog managing unit.

FIG. 5 shows an example of the functional configuration of the dialog managing unit 3 in FIG. 2.

The speaking speed as the rhythm information outputted from the speech recognizing unit 1 (the matching unit 14 in FIG. 3) and the processing result from the language processing unit 2 (the syntax/meaning analyzer 22 in FIG. 4) (i.e., the language processing result) are inputted to a dialog processor 31. Based on the language processing result from the language processing unit 2, the dialog processor 31 produces response generation information for instructing generation of a response sentence, etc. in reply to the speech recognition result from the speech recognizing unit 1 while referring to a scenario database 34 and a knowledge database 35.

More specifically, the scenario database 34 stores a scenario describing, e.g., a dialog pattern between the computer and the user for each task (topic), and the dialog processor 31 produces the response generation information in accordance with the scenario.

For an object-oriented task such as presetting a VCR to record a program, the following scenario is stored, by way of example, in the scenario database 34:

```
(action(Question(date, start time, end-time, channel)))
    (date ???)                    #data
    (start time      ???)         #start time
    (end time        ???)         #end time
    (channel ? ? ?)               #channel          (1)
```

According to the above scenario (1), when the language processing result from the language processing unit 2 represents a request for presetting a VCR to record a program, the dialog processor 31 produces the response generation information that instructs generation of sentences for questioning the date to record the program, the start time to record the program, the end time to end the recording, and the channel of the program to be recorded, in the order named.

Also, as a scenario to perform a non-objective dialog (so-called chat), which is represented by a dialog program such as ELIZA™ (for ELIZA™, see, e.g., Weizenbaum, Joseph, "ELIZA™—a computer program for the study of natural language communication between man and machine.", Communication of the ACM 9, 1966 and James Allen, "Natural Language Understanding", The Benjamin/Cunning Publishing Company Inc. PP. 6–9), the following one is stored, by way of example, in the scenario database 34:

If X exists then speak (Y)

X: keyword, Y: response sentence (money What do you want?) #(x Y)

(want to eat Are you hungry?)                           (2)

According to the above scenario (2), if a keyword "money" is included in the language processing result from the language processing unit 2, the dialog processor 31 produces the response generation information for instructing generation of a sentence to ask a question "What do you want?". Also, if a keyword "want to eat" is included in the language processing result from the language processing unit 2, the dialog processor 31 produces the response generation information for instructing generation of a sentence to ask a question "Are you hungry?".

The knowledge database 35 stores general knowledge necessary for performing a dialog between the user and the computer. More specifically, the knowledge database 35 stores, as general knowledge, such information that, when the language processing result from the language processing unit 2 represents that the user has uttered a greeting, the information instructs the dialog processor 31 to issue a greeting in reply to the user greeting. Also, the knowledge database 35 stores, as general knowledge, topics and so on to be used in a chat.

Further, the knowledge database 35 stores, as general knowledge, information about matters for inquiring user information regarding interests and tastes of the user (such as items to be inquired, intervals (time) of inquiries, and the number of times of inquiries).

Thus, the dialog processor 31 produces the response generation information while referring to the above-described knowledge in the knowledge database 35 as needed.

In addition, the dialog processor 31 executes profile collection processing to collect user information regarding interests and tastes of the user based on the speaking speed as the rhythm information outputted from the speech recognizing unit 1, the language processing result from the language processing unit 2, an output of an extractor 32, a dialog history stored in a dialog history storage 33, profile registry information stored in the user information management unit 4, etc., and to supply, to the user information management unit 4, profile control information for instructing the collected user information to be reflected in a user profile.

In other words, the dialog processor 31 recognizes interests and tastes of the user based on, e.g., words contained in the language processing result from the language processing unit 2 (or words contained in the speech recognizing result from the speech recognizing unit 1) and broader terms of those words. Then, in accordance with a recognition result, the dialog processor 31 produces the profile control information and supplies it to the user information management unit 4.

Further, based on the speaking speed obtained as the rhythm information from the speech recognizing unit 1, the language processing result from the language processing unit 2 and so on, the dialog processor 31 determines whether the topic in a dialog between the user and the computer has shifted (changed), thereby recognizing the number of times the same topic is mentioned, a time of the topic was mentioned, etc. Then, in accordance with a recognition result, the dialog processor 31 produces the profile control information and supplies it to the user information management unit 4.

In response to a request from the dialog processor 31, the extractor 32 extracts those ones among the words contained in the language processing result from the language processing unit 2, which are available as the information regarding interests and tastes of the user, and supplies the extracted words to the dialog processor 31. Also, the extractor 32 recognizes broader terms of the words contained in the language processing result from the language processing unit 2 by referring to a concept information database 36, and supplies the recognized broader terms to the dialog processor 31.

The concept information database 36 stores, e.g., a thesaurus expressing word concepts in a hierarchy structure, and the extractor 32 retrieves which concept on the thesaurus each word belongs to, thereby recognizing a broader term of the word. The dialog history storage 33 stores a history of the dialog between the user and the computer (i.e., a dialog history) in response to a request from the dialog processor 31. Herein, the dialog history includes not only the language processing result received by the dialog processor 31 from the language processing unit 2 and the response generation information produced depending on the language processing result, but also the number of times the same topic is mentioned, the time each response was mentioned, the time of each utterance by the user, etc. as required. These items of information form the dialog history which is supplied from the dialog processor 31 to the dialog history storage 33.

Figure 6:
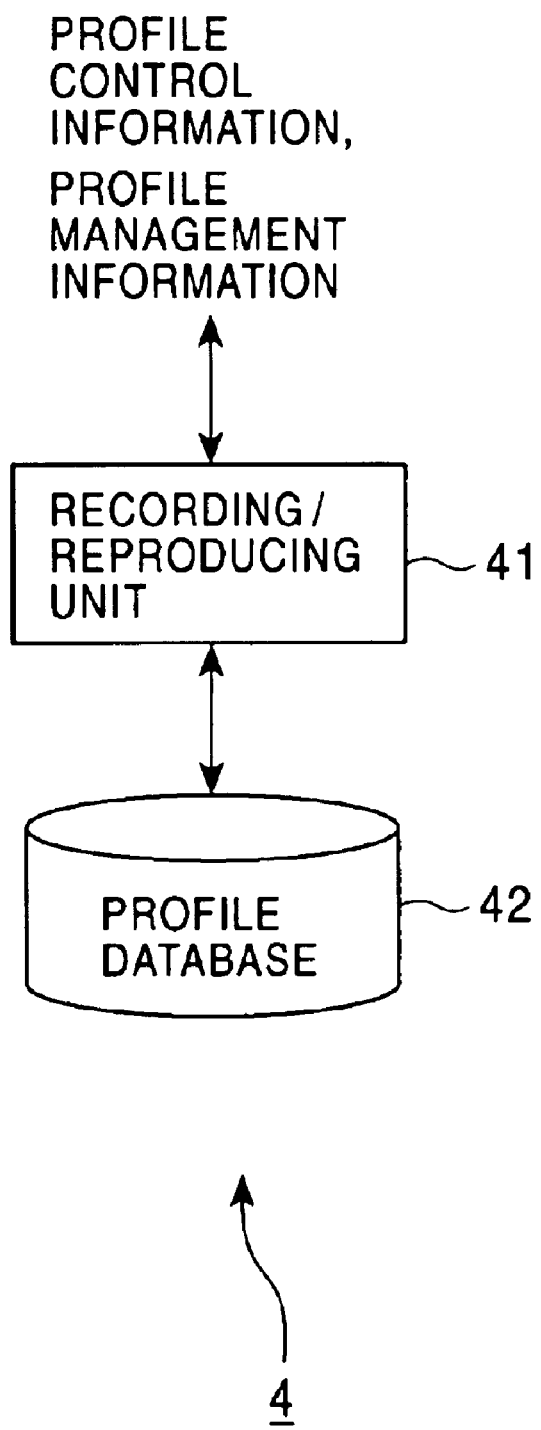
FIG. 6 is a block diagram showing an example of the configuration of a user information managing unit.

FIG. 6 shows an example of the functional configuration of the user information management unit 4 in FIG. 2.

The profile control information outputted from the dialog managing unit 3 (the dialog processor 31 in FIG. 5) is supplied to a recording/reproducing unit 41. In accordance with the profile control information, the recording/reproducing unit 41 records the user information regarding interests and tastes of the user in the user profile of the profile database 42.

Also, in response to a request from the dialog managing unit 3 (the dialog processor 31 in FIG. 5), the recording/reproducing unit 41 reads profile management information recorded in the profile database 42 and supplies it to the dialog managing unit 3 (the dialog processor 31 in FIG. 5).

The profile database 42 stores profile management information and a user profile shown respectively, by way of example, in FIGS. 7A and 7B.

More specifically, FIG. 7A shows the profile management information. In an example of FIG. 7A, the profile management information is made up of an identifier, interest information, and a threshold. The identifier is to identify the interest information, and has a unique value for each item of the interest information. The interest information represents categories (fields) indicating interests and tastes of the user. "Movie", "music", "car", "book" and "travel" are registered as items of the interest information in the example of FIG. 7A. The threshold is set for each item of the interest information, and has a registered value to be compared with the number of times, described later, recorded in the user profile.

FIG. 7B shows the user profile. In an example of FIG. 7B, the user profile is made up of an identifier, interest information, the number of times, and an interest flag. The identifier and the interest information are the same as those of the profile management information. The number of times represents a value obtained by estimating how many times the user has shown an interest on each category indicated by the interest information. The interest flag is a flag of, e.g., one bit. Only the interest flags corresponding to the items of the interest information, which indicate the categories in match with the interests and tastes of the user, are set to "1", for example, and the other interest flags are set to "0". With the user profile of FIG. 7B, therefore, the categories indicated by the interest information, for which the interest flags are set to "1", are in match with the interests and tastes of the user.

Figure 8:
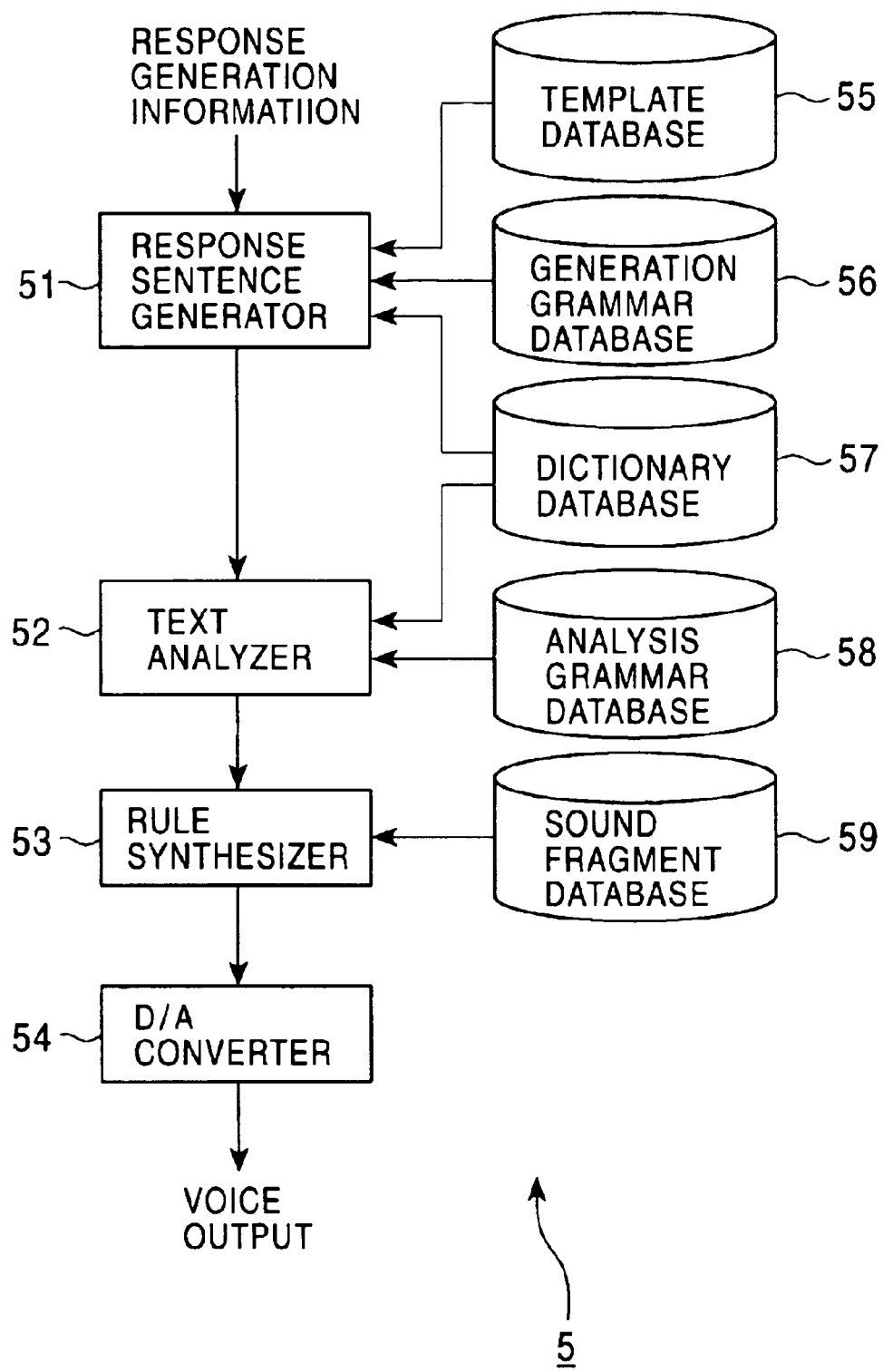
FIG. 8 is a block diagram showing an example of the configuration of a response generating unit.

FIG. 8 shows an example of the functional configuration of the response generating unit 5 in FIG. 2.

The response generation information is supplied to a response sentence generator 51 from the dialog managing unit 3 (the dialog processor 31 in FIG. 5). The response sentence generator 51 generates a response sentence in the form of a text corresponding to the response generation information while referring to a template database 55, a generation grammar database 56 and a dictionary database 57 as required, and then supplies the generated response sentence to a text analyzer 52.

More specifically, the template database 55 stores templates representing examples of the response sentence. The generation grammar database 56 stores grammar rules such as conjugation rules of words necessary for generating the response sentence and information about restrictions in the word sequence. The dictionary database 57 stores a word dictionary describing information of each word, such as a part of speech, pronunciation and an accent. The response sentence generator 51 generates a response sentence corresponding to the response generation information from the dialog managing unit 3 while referring to the templates, the grammar rules and the word dictionary as required, and then supplies the generated response sentence to the text analyzer 52.

Note that the method of generating a sentence is not limited to one employing templates, but may be practiced using, for example, a method based on the case structures.

The text analyzer 52 analyzes a text as the response sentence from the response sentence generator 51 while referring to the dictionary database 57 and an analysis grammar database 58.

More specifically, the dictionary database 57 stores the word dictionary described above. The analysis grammar database 58 stores analysis grammar rules such as restrictions on word linkage for the words contained in the word dictionary of the dictionary database 57. Based on the word dictionary and the analysis grammar rules, the text analyzer 52 performs analysis, such as morpheme analysis and syntax analysis, of the response sentence from the response sentence generator 51, and extracts information necessary for ruled speech synthesis to be executed in a subsequent rule synthesizer 53. The information necessary for the ruled speech synthesis includes, e.g., information for controlling pose positions, accents and intonations, other rhythm information, and phoneme information such as pronunciations of individual words.

The information obtained by the text analyzer 52 is supplied to the rule synthesizer 53. The rule synthesizer 53 creates speech data (digital data) in the form of synthesized sounds corresponding to the response sentence, which has been generated in the response sentence generator 51, by using a sound fragment database 59.

More specifically, the sound fragment database 59 stores sound fragment data in the form of, e.g., CV (Consonant, Vowel), VCV, and CVC. Based on the information from the text analyzer 52, the rule synthesizer 53 connects required sound fragments data to each other, and then adds poses, accents and intonations in proper positions, thereby creating voice data in the form of synthesized sounds corresponding to the response sentence which has been generated in the response sentence generator 51.

The created speech data is supplied to a D/A (Digital-to-Analog) converter 54 for conversion into a speech signal as an analog signal. The speech signal is supplied to a speech (not shown), which outputs the synthesized sounds corresponding to the response sentence generated in the response sentence generator 51.

The profile collection processing executed by the dialog managing unit 3 in FIG. 5 for collecting user information regarding interests and tastes of the user and reflecting the user information in a user profile (FIG. 7B) will be described below with reference to flowcharts of FIGS. 9 through 13.

When a user utters a speech or speaks and the words spoken by the user are recognized by the speech recognizing unit 1 and subjected to language processing by the language processing unit 2, the speaking speed obtained as the rhythm information of the user's speech by the speech recognizing unit 1 and the language processing result from the language processing unit 2 are supplied to the dialog processor 31 of the dialog managing unit 3. The dialog processor 31 supplies the language processing result from the language processing unit 2 to the extractor 32, causing it to extract a predetermined keyword contained in the language processing result, and stores the extracted keyword as part of a dialog history in the dialog history storage 33. Thereafter, the dialog processor 31 executes the profile collection processing described below.

Herein, therefore, the profile collection processing is executed whenever the user speaks. However, the profile collection processing may be executed after several words are exchanged between the user and the computer, or at intervals of a certain period of time.

Figure 9:
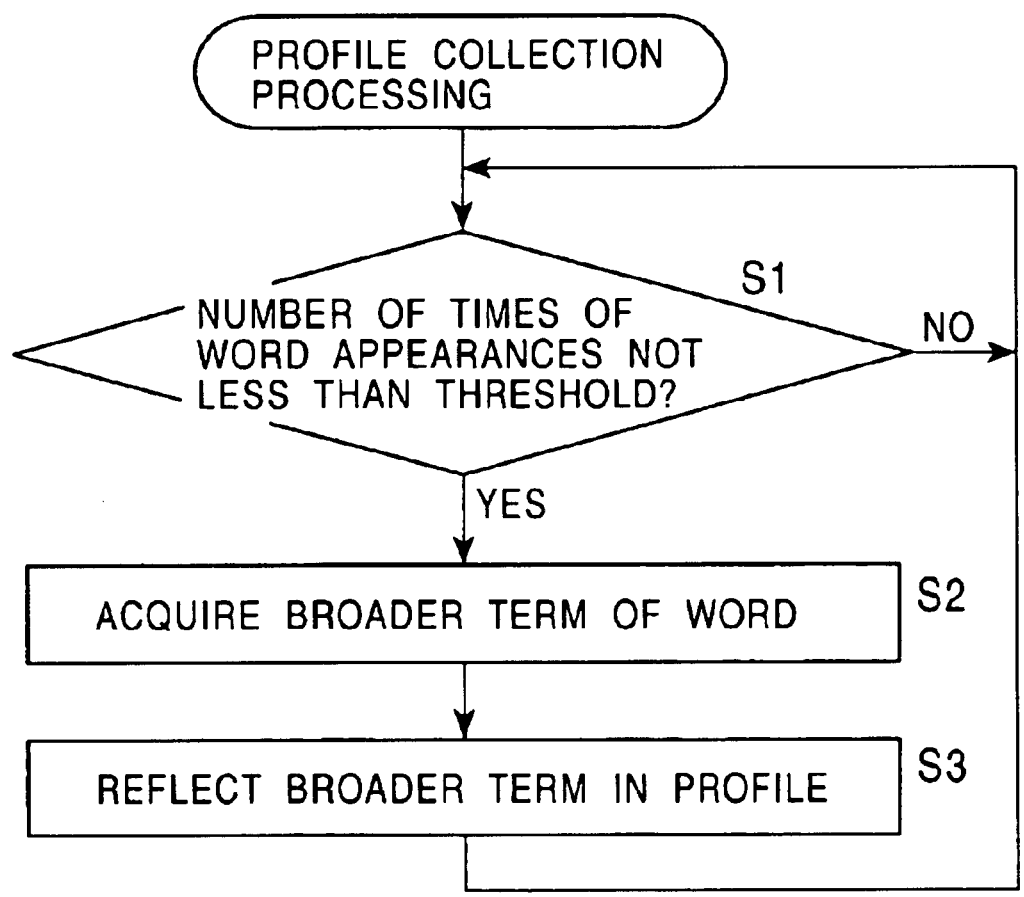
FIG. 9 is a flowchart showing a first embodiment of profile collection processing.

FIG. 9 is a flowchart showing a first embodiment of the profile collection processing.

In the embodiment of FIG. 9, the dialog processor 31 first, in step S1, focuses an attention on a certain one of the words registered in the dialog history by referring to the dialog history stored in the dialog history storage 33, and calculates the number of times of appearances (i.e., appearance frequency) of the target word. Further, in step S1, the dialog processor 31 determines whether the number of times of appearances of the target word is not less than a predetermined threshold. If it is determined that the number of times of appearances of the target word is less than the predetermined threshold, the dialog processor 31 returns to step S1 after waiting for until the user speaks again.

On the other hand, if it is determined in step S1 that the number of times that the target word appears is not less than the predetermined threshold, the processing flow goes to step S2 where the dialog processor 31 supplies the target word to the extractor 32 for acquiring a broader term of the target word.

More specifically, upon receiving the target word from the dialog managing unit 3, the extractor 32 recognizes a broader term of the target word by referring to the thesaurus stored in the concept information database 36, and supplies the recognized broader term to the dialog processor 31. In this way, the dialog processor 31 acquires in step S2 the broader term of the target word supplied from the extractor 32.

Subsequently, the processing flow goes to step S3 where the dialog processor 31 supplies, to the user information management unit 4 (the recording/reproducing unit 41 in FIG. 6), profile control information for instructing the broader term of the target word to be reflected in the user profile. The dialog processor 31 then returns to step S1 after waiting for until the user utters a next speech.

In this case, the recording/reproducing unit 41 of the user information management unit 4 (FIG. 6) refers to the user profile (FIG. 7B) in the profile database 42 and increments by one each time the interest information corresponds to the broader term indicated by the profile control information from the dialog processor 31.

Then, the dialog processor 31 instructs the recording/reproducing unit 41 to read out the profile management information (FIG. 7A) in the profile database 42, for thereby acquiring a threshold with respect to the interest information for which the number of times has been incremented. Further, the dialog processor 31 compares the threshold acquired as described above (hereinafter referred to also as the acquired threshold) with the number of times having been incremented (hereinafter referred to also as the incremented number of times), and determines which one of the acquired threshold and the incremented number of times is larger. Stated otherwise, the dialog processor 31 instructs the recording/reproducing unit 41 to read the incremented number of times out of the user profile in the profile database 42, and determines whether the read-out incremented number of times is not less than the acquired threshold. If the incremented number of time is not less than the acquired threshold, the dialog processor 31 controls the recording/reproducing unit 41 such that, when an interest flag for the interest information corresponding to the incremented number of times is at a level of "0", the interest flag is set to "1".

Accordingly, for example, when the user is interested in movies and has spoken many words such as the cast names, director names, titles and the location sites of the movies, the interest flag for the interest information corresponding to "movie", which is a broader term of those words, is set to "1".

Note that the profile collection processing of FIG. 9 is performed by employing, as target words, all of the words registered in the dialog history which is stored in the dialog history storage 33.

Figure 10:
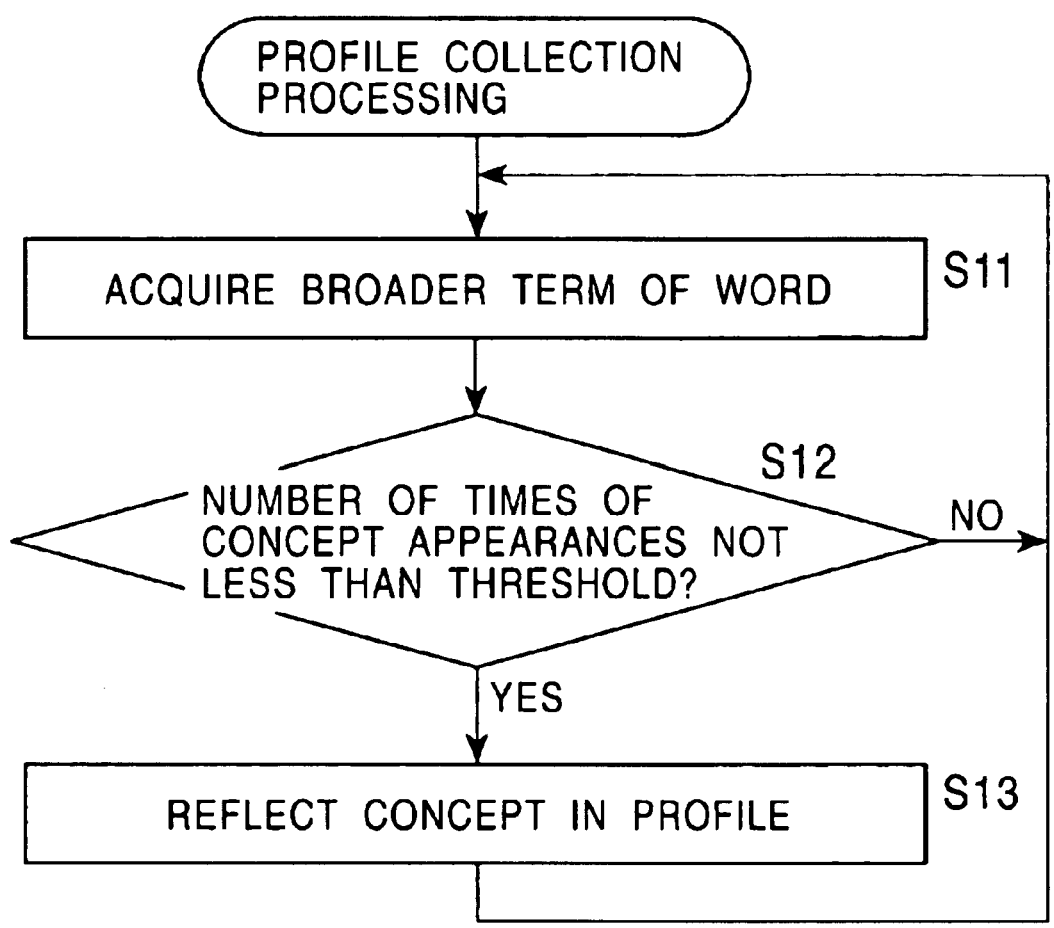
FIG. 10 is a flowchart showing a second embodiment of the profile collection processing.

FIG. 10 is a flowchart showing a second embodiment of the profile collection processing.

In the embodiment of FIG. 10, the dialog processor 31 first, in step S11, refers to the dialog history stored in the dialog history storage 33 and controls the extractor 32 so as to acquire a broader term of each word registered in the dialog history.

Then, the processing flow goes to step S12 where the dialog processor 31 focuses an attention on a certain one of the acquired broader terms and calculates the number of times of appearances (i.e., appearance frequency) of the target broader term. Further, in step S12, the dialog processor 31 determines whether the number of times of appearances of the target broader term is not less than a predetermined threshold. If it is determined that the number of times of appearances of the target broader term is less than the predetermined threshold, the dialog processor 31 returns to step S1 after waiting for until the user speaks again.

On the other hand, if it is determined in step S12 that the number of times or appearances of the target broader term is not less than the predetermined threshold, the processing flow goes to step S13 where the dialog processor 31 supplies, to the user information management unit 4 (the recording/reproducing unit 41 in FIG. 6), profile control information for instructing the target broader term to be reflected in the user profile. The dialog processor 31 then returns to step S11 after waiting until the user speaks again.

In this case, the dialog processor 31 executes similar processing as described above in connection with the first embodiment of FIG. 9. As a result, for example, when the user is interested in movies and has spoken many words belonging to a broader term "movie", such as the cast names, director names, titles and the location sites of the movies, the interest flag for the interest information corresponding to "movie" is set to "1".

Note that the profile collection processing of FIG. 10 is performed by employing, as target broader terms, the broader terms of all the words registered in the dialog history which is stored in the dialog history storage 33.

Also, while words are registered in the dialog history in the embodiment of FIG. 10, broader terms of words may be registered in the dialog history.

Figure 11:
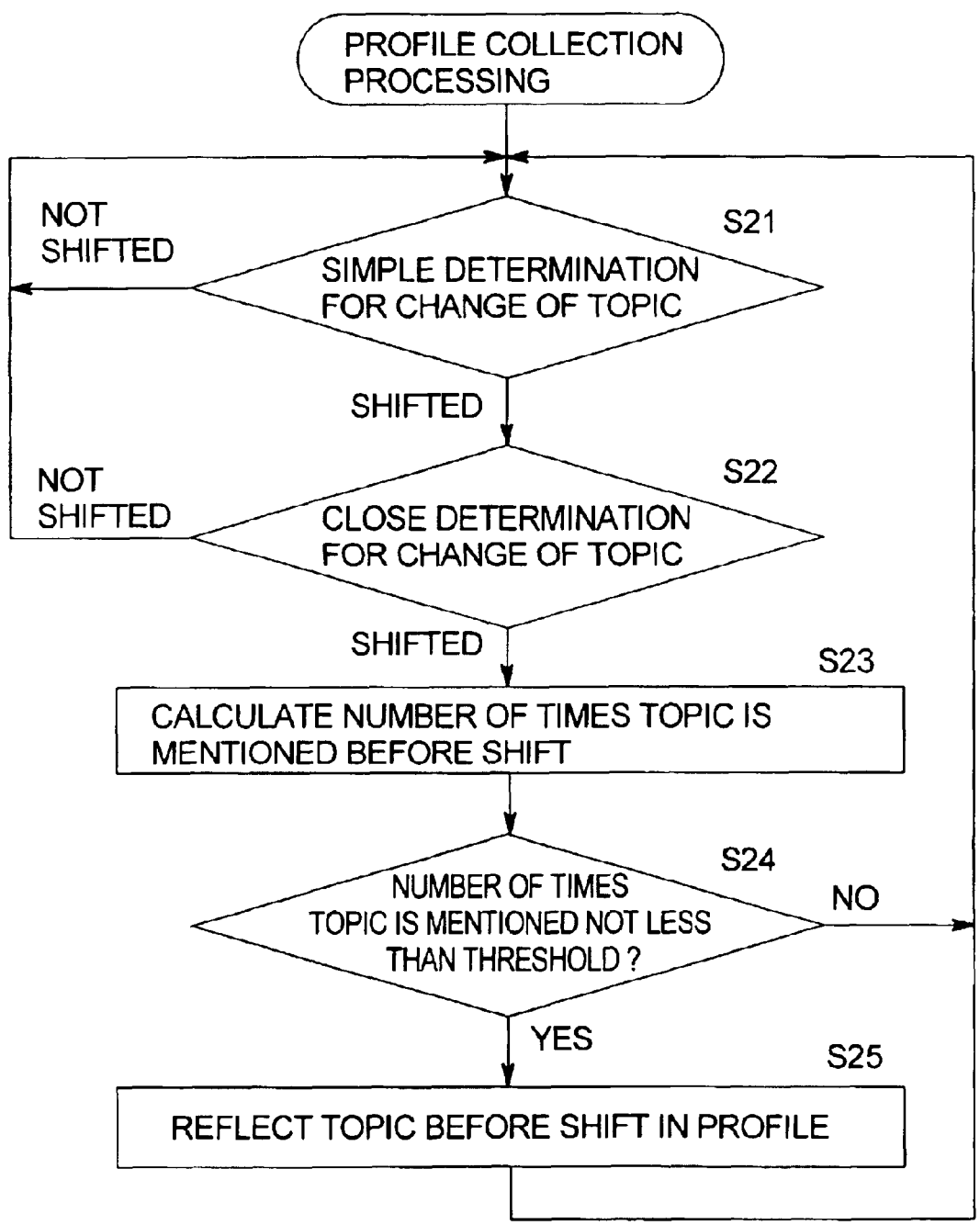
FIG. 11 is a flowchart showing a third embodiment of the profile collection processing.

FIG. 11 is a flowchart showing a third embodiment of the profile collection processing.

In the embodiment of FIG. 11, the dialog processor 31 first, in step S21, performs simple determination as to whether the topic of a dialog between the user and the computer has shifted.

The simple (rough) determination as to whether the topic has shifted can be performed, for example, as follows.

First, the simple determination as to whether the topic has shifted can be performed based on the speaking speed supplied from the speech recognizing unit 1. In general, when the topic is shifted, the speaking speed tends to slow down and then increases to a higher pitch. If the speaking speed has changed in such a manner, it can be determined that the topic has shifted.

Secondly, when shifting the topic, specific wordings, such as "Well, let's change the subject" and "Is there anything else?", are often used. If such a wording is contained in the language processing result from the language processing unit 2, it can also be determined that the topic has shifted.

Thirdly, when the topic is shifted, similarity or correlation in the meaning between words (vocabularies), which are contained in both the language processing results outputted from the language processing unit 2 before and after the shift of the topic, tends to decrease. Therefore, whether the topic has shifted or not can be determined based on such similarity or correlation in the meaning between words.

The similarity or correlation in the meaning between words can be calculated, for example, based on the thesaurus stored in the concept information database 36. In other words, similarity in the meaning between two words can be calculated, for example, based on a broader term in common to the two words using the thesaurus.

If a result of the simple determination in step S21 shows that the topic is not shifted, the dialog processor 31 returns to step S21 after waiting until the user utters or speaks again.

On the other hand, if it is determined in step S21 that the topic has shifted, the processing flow goes to step S22 where the dialog processor 31 performs close determination (i.e., determination with higher accuracy than that of the simple determination) as to whether the topic of a dialog between the user and the computer has shifted.

The close determination as to whether the topic has shifted is performed, for example, by reviewing the language processing result of a speech uttered from the user while referring to the dialog history.

If it is determined in step S22 that the topic is not shifted, the dialog processor 31 returns to step S21 after waiting for until the user utters or speaks again. If it is determined in step S22 that the topic has shifted, the processing flow goes to step S23.

While, in the embodiment of FIG. 11, whether the topic has shifted or not is determined by carrying out the simple determination and then the close determination, only the close determination may be carried out to determine whether the topic has shifted without carrying out the simple determination (this is equally applied to the processing of FIGS. 12 and 13 described later). Note that the simple determination is inferior in the determination accuracy, but requires processing with a light load, whereas the close determination is superior in the determination accuracy, but requires processing with a heavy load. In the case of carrying out the close determination alone, therefore, redundancy in the determination accuracy, but the close determination imposing a heavy load must be performed each time the user utters a speech. On the other hand, in the case of carrying out the simple determination and then the close determination, the processing is somewhat redundant, but the close determination imposing a heavy load is just required to be performed only when it is determined by the simple determination that the topic has shifted.

In step S23, the dialog processor 31 calculates the number of speeches uttered by the user on the topic before shift, while referring to the dialog history, and then goes to step S24.

Assume now that the following conversation, for example, is exchanged between the user and the interactive user-profile collecting system:
1: sys>How do you spend the weekend?
2: usr>Last week, I saw the film "A" at the movie theater 000.
3: sys>Whom do you like in the cast?
4: usr>Actress xxxx.
5: sys>Recently, did you go to any other movie?
6: usr>Say, I saw the film "B", too, two weeks ago.
7: sys>Really?
8: usr>Well, let's change the subject.
9: sys>What subject?
10: usr>I want to know about "CC". (3)

In this conversation, the dialog processor 31 determines that the topic has shifted at the eighth speech when "8: usr>Well, let's change the subject." was uttered by the user.

In the above conversation (3), "sys>" represents dialog (synthesized sounds) issued by the computer (interactive user-profile collecting system), and :usr>" represents speech uttered by the user. The numeral before "sys>" or "usr>" indicates the number of times speech has been issued, uttered or spoken by the user and/or the processor.

Also, in the above conversation (3), the topic is shifted at the eighth speech by the user, as mentioned above, and the topic before the shift covers from the first speech by the system to the seventh speech by the system. During this period, the user utters three speeches or speaks three times, i.e., the second, fourth and sixth ones. In this case, therefore, the number of times that the topic was mentioned before the shift was three.

Incidentally, the topic covered from the first speech to the seventh speech in the above conversation (3) is "movie".

In step S24, the dialog processor 31 determines whether the number of times a topic is spoken before being shifted is not less than a predetermined threshold. If it is determined that the number of times a topic is spoken is less than the predetermined threshold, i.e., if the user does not utter speeches or speak on the topic very many times before the shift and hence the user seems to be not so interested in the topic before the shift, the dialog processor 31 returns to step S21 after waiting until the user utters or speaks again.

On the other hand, if it is determined in step S24 that the number of times a topic is spoken is not less than the predetermined threshold, i.e., if the user speaks on the topic several times before the shift and hence the user seems to be so interested in the topic before the shift, the processing flow goes to step S25 where the dialog processor 31 supplies, to the user information management unit 4 (the recording/reproducing unit 41 in FIG. 6), profile control information for instructing the topic before the shift to be reflected in the user profile. The dialog processor 31 then returns to step S21 after waiting until the user utters or speaks again.

In this case, the recording/reproducing unit 41 of the user information management unit 4 (FIG. 6) refers to the user profile (FIG. 7B) in the profile database 42 and increments by one each time the interest information corresponds to the topic indicated by the profile control information from the dialog processor 31.

Then, the dialog processor 31 instructs the recording/reproducing unit 41 to read out the profile management information (FIG. 7A) in the profile database 42, for thereby acquiring a threshold with respect to the interest information for which the number of times has been incremented. Further, the dialog processor 31 compares the threshold acquired as described above (i.e., the acquired threshold) with the number of times having been incremented (i.e., the incremented number of times), and determines which one of the acquired threshold and the incremented number of times is larger. Stated otherwise, the dialog processor 31 instructs the recording/reproducing unit 41 to read the incremented number of times out of the user profile in the profile database 42, and determines whether the read-out incremented number of times is not less than the acquired threshold. If the incremented number of times is not less than the acquired threshold, the dialog processor 31 controls the recording/reproducing unit 41 such that, when an interest flag for the interest information corresponding to the incremented number of times is at a level of "0", the interest flag is set to "1".

Accordingly, for example, when the user is interested in movies and has uttered or spoke many times on the topic "movie" before changing the topic, the interest flag for the interest information corresponding to the topic "movie" is set to "1".

While the embodiment of FIG. 11 has been described as calculating the number of times the user speaks on the topic before the shift, the number of times the topic is mentioned or spoken may be obtained by calculating not only the number of times the user speaks, but also by the number of times the system speaks.

Figure 12:
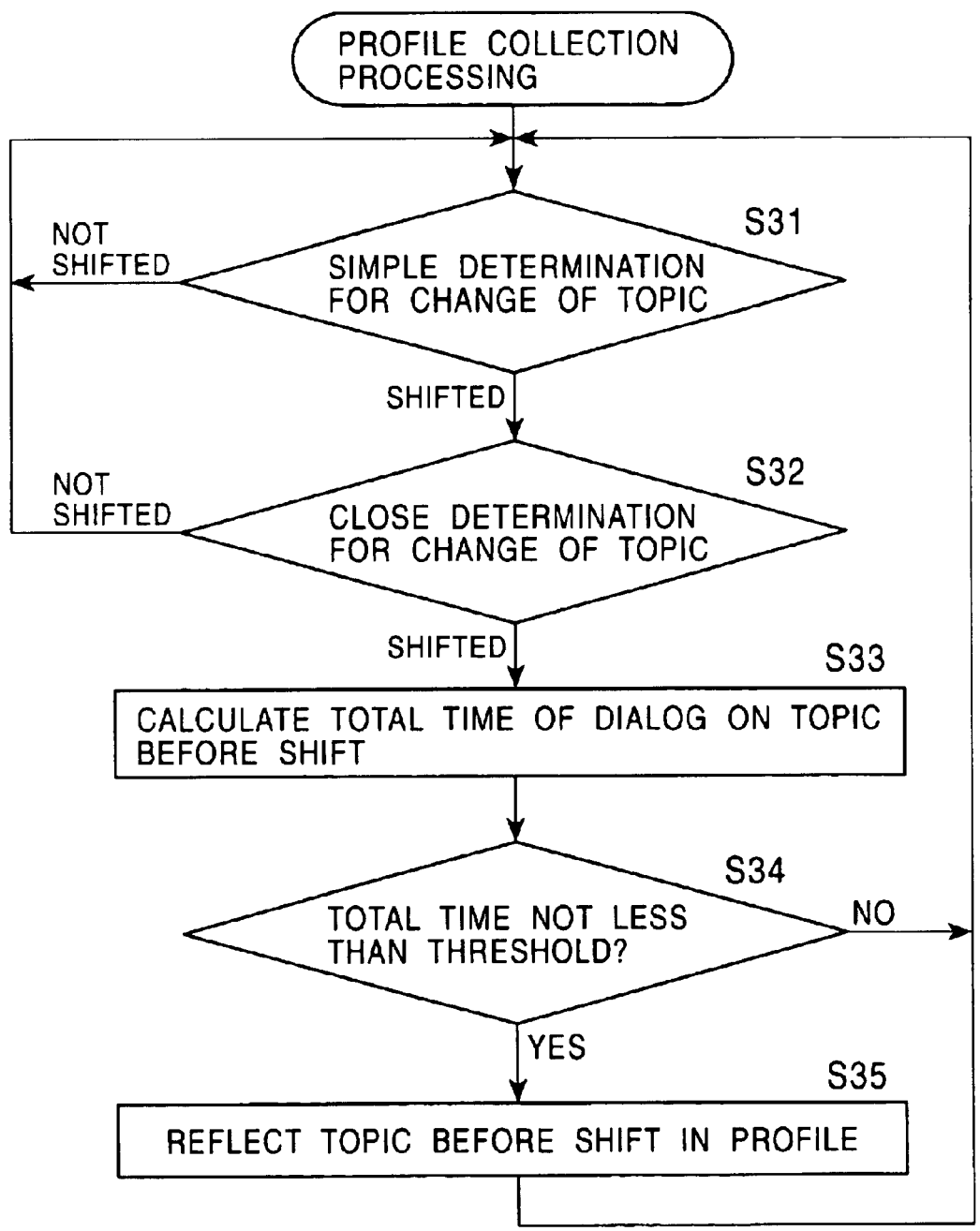
FIG. 12 is a flowchart showing a fourth embodiment of the profile collection processing.

FIG. 12 is a flowchart showing a fourth embodiment of the profile collection processing.

In the embodiment of FIG. 12, the dialog processor 31 executes determination processing in steps S31 and S32 in the same manners as those in steps S21 and S22 in FIG. 11, respectively.

Then, if it is determined in step S32 that the topic has shifted, the processing flow goes to step S33 where the dialog processor 31 calculates a total time during which the user has spoken and the time during which the system has spoken, by referring to the dialog history. Thereafter, the processing flow goes to step S34.

More specifically, assuming, for example, that the above-described conversation (3) has been exchanged between the user and the system, the dialog processor 31 determines that the topic has shifted at the eighth speech "8: usr>Well, lets change the subject." uttered by the user. In this case, a period of time from the time at which the first speech by the system has started to the time at which the seventh speech by the system has ended is calculated in step S33 as a total time of the dialog on the topic before shift.

Since the dialog history registers therein the time at which the user has uttered each speech, etc. as described above, the speech time can be calculated by referring to such time data stored in the dialog history.

In step S34, the dialog processor 31 determines whether the speech time on the topic before shift is not less than a predetermined threshold. If it is determined that the speech time is less than the predetermined threshold, i.e., if a conversation is not exchanged between the user and the system for a not so long time on the topic before a shift and hence the user seems to not be interested in the topic before the shift, the dialog processor 31 returns to step S31 after waiting for the user to speak again.

On the other hand, if it is determined in step S34 that the speech time is not less than the predetermined threshold, i.e., if a conversation is exchanged between the user and the system for a relatively long time on the topic before shifting and hence the user seems to be so interested in the topic before the shift, the processing flow goes to step S35 where the dialog processor 31 supplies, to the user information management unit 4 (the recording/reproducing unit 41 in FIG. 6), profile control information for instructing the topic before shift to be reflected in the user profile. The dialog processor 31 then returns to step S31 after waiting for until the user utters a next speech.

In this case, the dialog processor 31 executes similar processing as described above in connection with the third embodiment of FIG. 11. As a result, for example, when the user is interested in movies and a conversation regarding movies, i.e., such points as the cast names, director names, titles and the location sites of the movies, is exchanged between the user and the system for a relatively long time, the interest flag for the interest information corresponding to "movie" is set to "1".

While the embodiment of FIG. 12 has been described as calculating a total time of the dialog or speech by both the user and the system on the topic before the shift, the speech time may be obtained by calculating only a time of the speech by the user or a time of the speech by the system.

Figure 13:
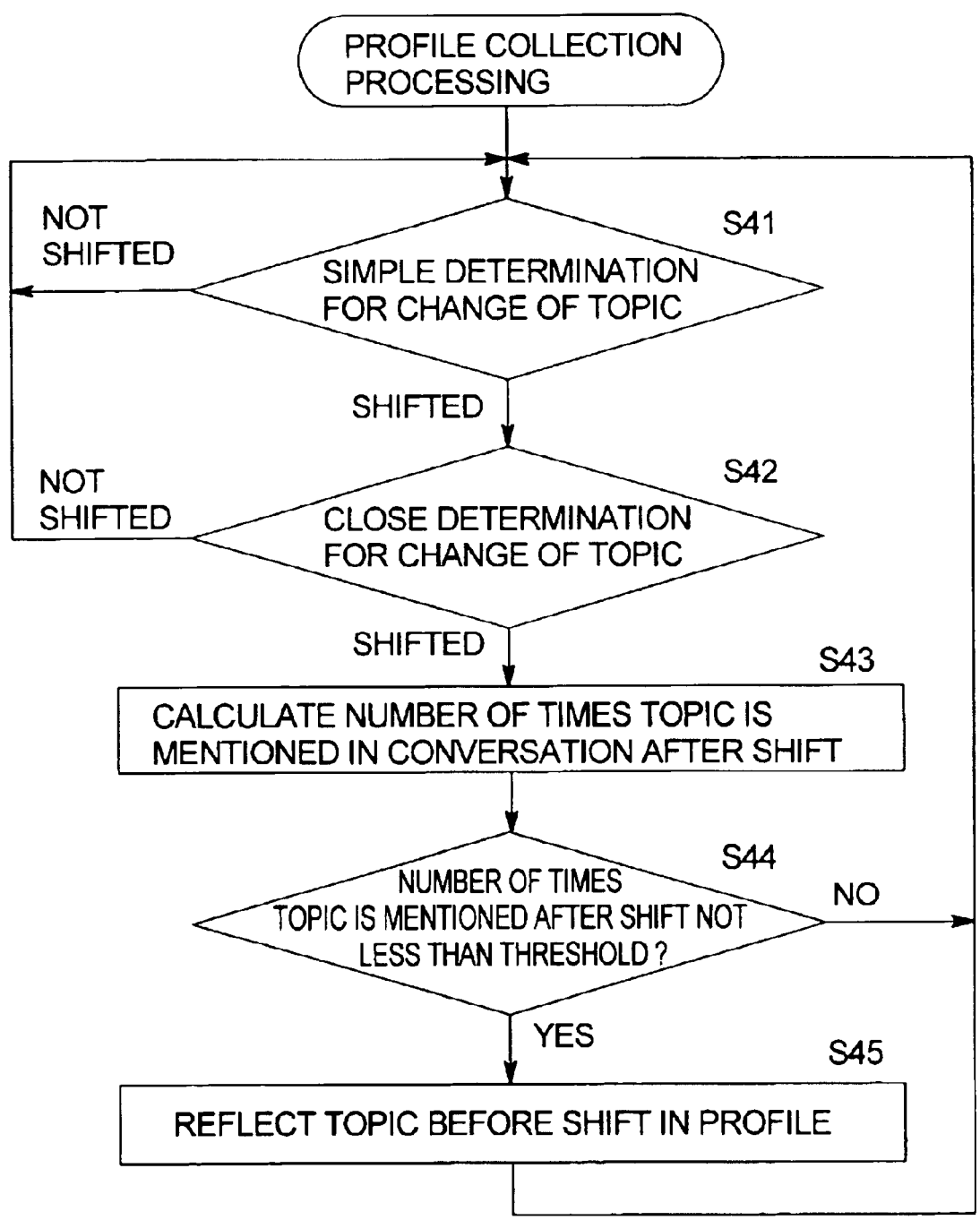
FIG. 13 is a flowchart showing a fifth embodiment of the profile collection processing.

FIG. 13 is a flowchart showing a fifth embodiment of the profile collection processing.

In the embodiment of FIG. 13, the dialog processor 31 executes determination processing in steps S41 and S42 in the same manners as those in steps S21 and S22 in FIG. 11, respectively.

Then, if it is determined in step S42 that the topic has shifted, the processing flow goes to step S43 where the dialog processor 31 calculates the number of times at which a conversation has been exchanged on the topic after shift (i.e., the number of times of appearances of the topic after shift during the dialog) by referring to the dialog history. Thereafter, the processing flow goes to step S44.

In step S44, the dialog processor 31 determines whether the number of times of appearances of the topic after a shift is not less than a predetermined threshold. If it is determined that the number of times of appearances of the topic after the shift is less than the predetermined threshold, i.e., if a conversation is not exchanged between the user and the system in a not so large number of times on the topic after the shift and hence the user seems to be not so interested in the topic after shift, the dialog processor 31 returns to step S41 after waiting for until the user speaks again.

On the other hand, if it is determined in step S44 that the number of times of appearances of the topic after the shift is not less than the predetermined threshold, i.e., if a conversation is exchanged between the user and the system in a relatively large number of times on the topic after shift and hence the user seems to be so interested in the topic after the shift, the processing flow goes to step S45 where the dialog processor 31 supplies, to the user information management unit 4 (the recording/reproducing unit 41 in FIG. 6), profile control information for instructing the topic after shift to be reflected in the user profile. The dialog processor 31 then returns to step S41 after waiting for until the user utters a next speech.

In this case, the dialog processor 31 executes similar processing as described above in connection with the third embodiment of FIG. 11. As a result, for example, when the user is interested in movies and a conversation regarding movies, i.e., such points as the cast names, director names, titles and the location sites of the movies, is exchanged between the user and the system in a relatively large number of times, the interest flag for the interest information corresponding to "movie" is set to 111".

More specifically, assuming now that a conversation is exchanged between the user and the system and the topic has shifted in the sequence of, e.g., a topic regarding movies, a topic regarding music, a request for job, a topic regarding movies, a topic regarding books, a topic regarding movies, and a topic regarding movies, the number of times of appearances of the topic "movie" is calculated to be four at a point in time when the topic has shifted to the last one regarding movies. Then, assuming that the predetermined threshold used in step S44 is four, the number of times for the interest information corresponding to "movie" in the user profile (FIG. 7B) is incremented by one after the topic has shifted to the last one regarding movies. Further, if the number of times having been incremented (i.e., the incremented number of times) is not less than the threshold for the interest information corresponding to "movie" in the profile management information (FIG. 7A) (e.g., four in the example of FIG. 7A), the interest flag for the interest information corresponding to the topic "movie" in the user profile is set to "1".

With the profile collection processing, as described above, while the user is exchanging some conversation with the system, user information regarding interests and tastes of the user is collected and reflected in a user profile. Therefore, the user profile reflecting the interests and tastes of the user can be easily prepared without imposing any burden on the user. Further, the interests and tastes of the user can be recognized by referring to the user profile. Consequently, for example, when searching information provided from WWW servers, those ones among search results from search engines, which are in match with the user profile, can be provided to the user so that the user may easily obtain desired information.

Also, with the profile collection processing, since the interests and tastes of the user are collected while the user is exchanging some conversation with the system, other interests and tastes than being perceived by the user may be sometimes reflected in the user profile.

It is to be noted that, in the present invention, the processing steps executing the program necessary for operating the computer to carry out various kinds of processing are not always required to run in time series following the sequences described in the flowcharts, but they may be run in parallel or individually (e.g., with parallel processing or object-oriented processing).

Also, the program may be executed by one computer or a plurality of computers in a distributed manner. Further, the program may be executed by a computer at a remote location after being transferred to there.

Moreover, a sequence of the above-described processing steps may be executed by dedicated hardware rather than using software.

While, in the embodiment described above, a response sentence is outputted from the system in the form of synthesized sounds, the response sentence may be displayed on a display unit.

In the embodiment described above, interest flags each having one bit is provided in the user profile (FIG. 7B), and when the number of times is increased to a value not less than a threshold defined in the profile management information (FIG. 7A), the corresponding interest flag is set from "0" to "1". However, the interest flag may have three or more different values. This case enables a value of the interest flag to reflect a degree of user interest on the corresponding interest information by incrementing the interest flag one by one, for example, whenever the number of times reaches a value once, twice and so on as large as the threshold defined in the profile management information (FIG. 7A).

Additionally, the user information regarding interests and tastes of the user is collected in the above-described embodiment, but the present invention is also applicable to the case of collecting other kinds of user information.

According to the information processing apparatus, the information processing method, and the storage medium of the present invention, speech of a user is recognized and a dialog sentence for exchanging a dialog with the user is created based on a result of the speech recognition. Also, user information is collected based on the speech recognition result. Therefore, the user information regarding, e.g., interests and tastes of the user can be easily collected.

What is claimed is:

1. An information processing apparatus for collecting user information, comprising:

speech recognizing means for recognizing speech of a user;

dialog sentence creating means for creating a dialog sentence to exchange a dialog with the user based on a result of the speech recognition performed by said speech recognizing means; and collecting means for collecting the user information based on the speech recognition result, wherein said collecting means tracks when a same topic is included in the speech of the user for a designated length of time based on the speech recognition result and collects the user information based on the designated length of time.

2. An information processing apparatus according to claim 1, further comprising storage means for storing the user information.

3. An information processing apparatus according to claim 1, wherein said dialog sentence creating means outputs the dialog sentence as one of a text and synthesized sounds.

4. An information processing apparatus according to claim 1, wherein said collecting means collects the user information based on an appearance frequency of a word contained in the speech recognition result.

5. An information processing apparatus according to claim 1, wherein said collecting means collects the user information based on a broader form of a word contained in the speech recognition result.

6. An information processing apparatus according to claim 1, wherein the user information is information indicating interests of the user.

* * * * *